US009897129B2

(12) United States Patent
Fahy

(10) Patent No.: US 9,897,129 B2
(45) Date of Patent: Feb. 20, 2018

(54) CAPTIVE FLOATING FLARE NUT

(71) Applicant: Penn Engineering & Manufacturing Corp., Danboro, PA (US)

(72) Inventor: Trevor Fahy, Galway (IE)

( * ) Notice: Subject to any disclaimer, the term of this patent is extended or adjusted under 35 U.S.C. 154(b) by 105 days.

(21) Appl. No.: 15/198,419

(22) Filed: Jun. 30, 2016

(65) Prior Publication Data

US 2017/0002854 A1 Jan. 5, 2017

Related U.S. Application Data

(60) Provisional application No. 62/186,659, filed on Jun. 30, 2015.

(51) Int. Cl.
*F16B 37/04* (2006.01)
*F16B 37/06* (2006.01)

(52) U.S. Cl.
CPC ............ *F16B 37/065* (2013.01); *F16B 37/04* (2013.01); *F16B 37/044* (2013.01)

(58) Field of Classification Search
CPC ...... F16B 37/04; F16B 37/044; F16B 37/065; F16B 37/122
USPC ................................ 411/172, 176, 178, 183
See application file for complete search history.

(56) References Cited

U.S. PATENT DOCUMENTS 1,711,291 A * 4/1929 Strama ................ B65D 39/084 220/288
2,170,472 A * 8/1939 Fitch .................... F16B 33/002 29/509
2,415,695 A * 2/1947 Cann .................... B23P 19/062 29/512
3,204,517 A * 9/1965 Looker .............. F16B 19/1054 411/80.1
3,515,028 A * 6/1970 Patton ................ F16B 19/1054 411/42
3,948,142 A * 4/1976 McKay ................ F16B 37/067 411/38
4,499,647 A * 2/1985 Sakamura ............ B23P 19/062 29/509
4,911,592 A * 3/1990 Muller .................. B23P 19/062 29/432.2
6,325,580 B1 * 12/2001 Diamond ............. F16B 37/067 411/183
6,866,456 B2 * 3/2005 Bentrim ............... F16B 37/065 411/353
7,338,241 B2 * 3/2008 Bond .................... F16B 37/044 411/172
2014/0079505 A1 * 3/2014 Tsai ...................... F16B 37/065 411/34

* cited by examiner

*Primary Examiner* — Roberta S Delisle
(74) *Attorney, Agent, or Firm* — Ryder, Lu, Mazzeo & Konieczny LLC; Joseph M. Konieczny, Sr.; Gregory J. Gore

(57) ABSTRACT

A non-rotational, flare nut attached to a panel with tolerance float formed and applied using special flaring tool, which simultaneously creates a square profile on the shank as the nut is attached. During flaring, the shank is broken into radially extending segments that provide retention to the panel with the ability to “float” on the panel by an amount equal to the clearance between the hole and the shank of the nut. The length of the segments allow for a greater float distance. The anti-rotation capability is provided by interference between the flat sides of the nut shank and the sides of the rectangular receiving hole.

19 Claims, 4 Drawing Sheets

7 7 5 5 26 4 7 7 27

FIG. 1
(PRIOR ART)
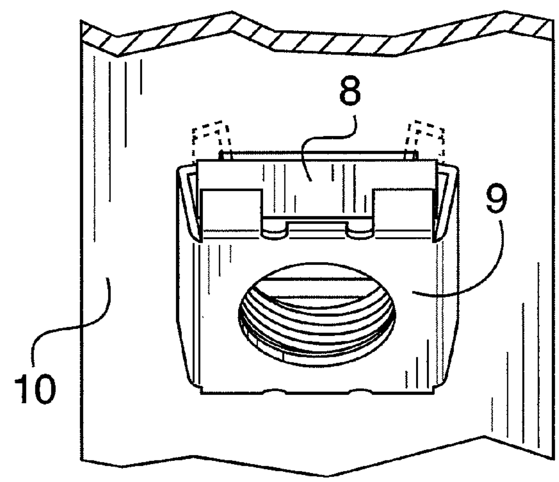
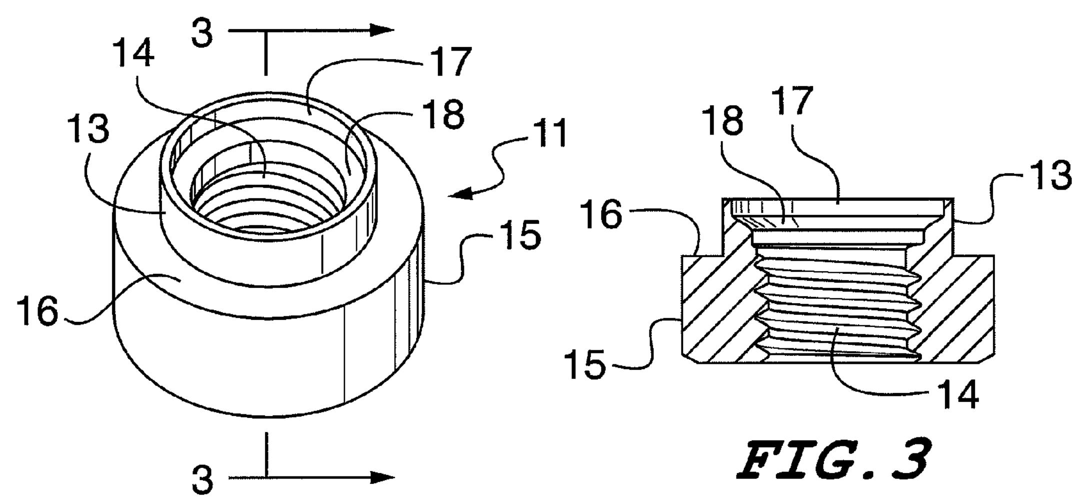
FIG. 2
FIG. 3

23
5
5
20
2
21

20
2
25
21
23

20
BEFORE
20
AFTER
2
4
2
7
27
11
1

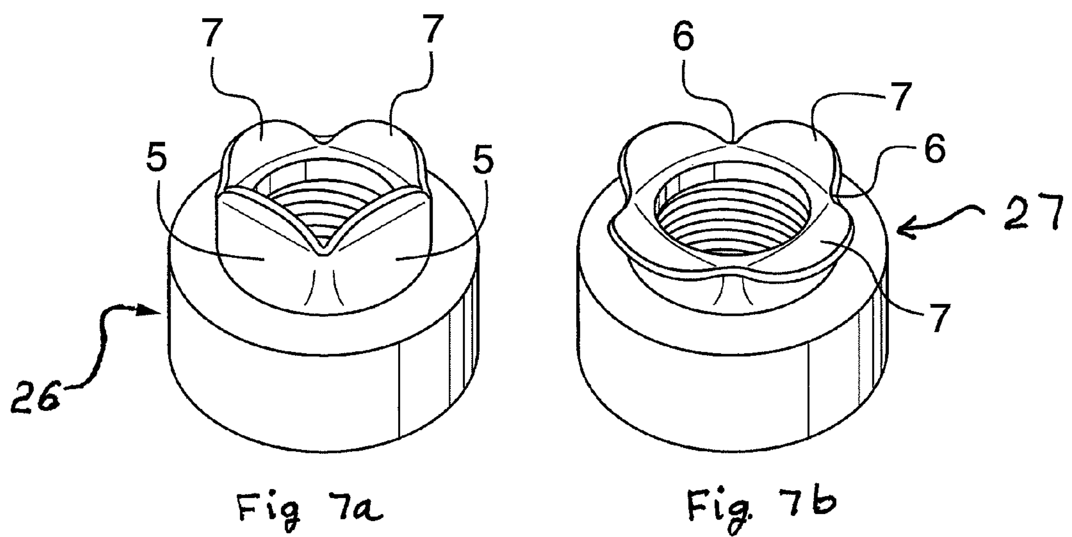
Fig 7a
Fig. 7b
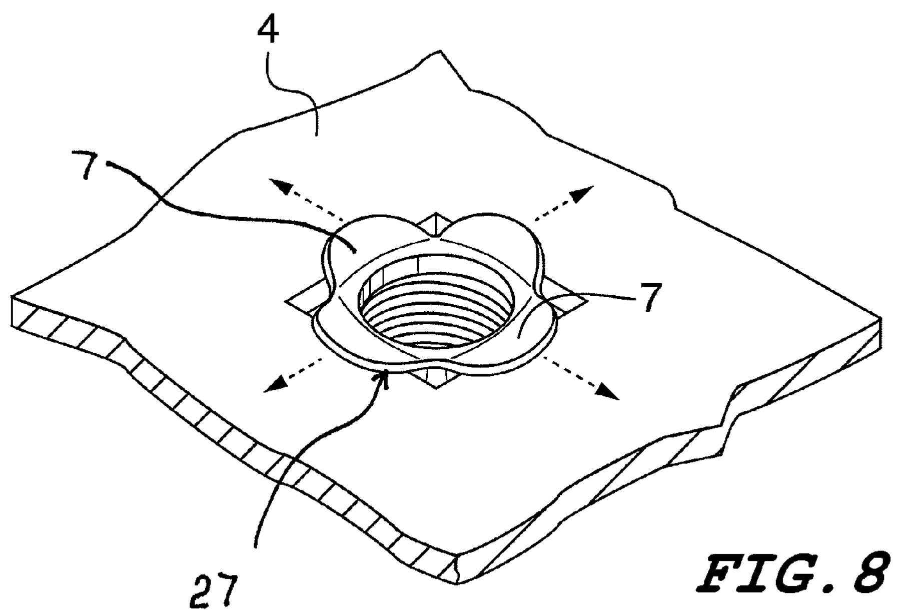
FIG. 8

CAPTIVE FLOATING FLARE NUT

RELATED APPLICATIONS

This application is a non-provisional patent application based on U.S. provisional patent application No. 62/186,659, entitled "Captive Floating Flare Nut", filed on Jun. 30, 2016, priority from which is hereby claimed.

FIELD OF THE INVENTION

This invention relates to a flare nut that is both floating and non-rotational, an improved method for making the flare nut, and captivating the nut to a panel. More specifically, it relates to a floating and non-rotational flare nut made from a basic nut blank using flaring tooling, which forms the floating and non-rotational features of the flare nut in a single installation stroke.

BACKGROUND OF THE INVENTION

Non-rotational fixed fasteners are well known and employed in many panel assemblies. Use of such fasteners, however, requires accurate alignment of the assembled components since non-rotational fixed fasteners provide no alignment tolerance. To compensate for misalignment of mating components, usually a screw or bolt, non-rotational loose or floating nuts are employed on a base panel. Typically, such fasteners are mounted on the backside of a panel to which the screw or stud is applied.

Referring to FIG. 1, floating captive nuts are one type of non-rotational loose nuts that provide the needed alignment tolerance between mating components 10. The nut 8 of a floating captive nut is held by a cage 9 within a confined space but with sufficient clearance to allow the nut to linearly translate or "float" but not rotate. Typically, these nuts are multi-part assemblies such as the cage-nut construction seen in FIG. 1. This type of nut can adjust to allow easier alignment of blind mating parts. However, during insertion (assembly) of the stud, the entire blind assembly can be unintentionally pushed out of the receiving hole, which requires an expensive re-working of the assembly. Therefore, it would be desirable to provide a floating flare nut that is captivated more securely to prevent push out.

The flare nut with a pre-formed square shank is another known non-rotational fastener. During assembly, the square shank is flared over a panel to provide float and retention. The pre-formed square shank flare nut has the disadvantage of being costly to produce. Therefore, it would be desirable to provide a floating flare nut that is easily and inexpensively produced.

SUMMARY OF THE INVENTION

The captive floating flare nut and manufacturing method of the present invention solve the deficiencies of the aforementioned fasteners. The novel flare nut of the present invention is non-rotational and floating. The flare nut has a shank that is larger than its receiving hole. The shank is formed with special flare tooling, which simultaneously creates a square profile on the shank, and splits and flares the shank walls outwardly to form flared segments. In a preferred embodiment, the flared segments retain the nut on the panel but with the ability to "float" on the panel by an amount equal to the clearance between the hole and the shank. The anti-rotation capability is provided by interference between the flat sides of the squared shank and the sides of the non-round receiving hole.

In a preferred embodiment, the novel flare nut is formed from a simple cylindrical blank. The flare nut is simultaneously formed and installed on a panel using a square-profiled installation tool that has a tapered pyramidal point. The special shape of the tool simultaneously creates the square profile and flares the walls of the shank. The resulting shape provides the translational and anti-rotational features.

In another embodiment, the invention comprises an assembly having a flare nut fastener affixed to a panel. The fastener has a central axial bore, and a shank extending downward from a distal top end to a base, which has a greater diameter than the shank. The shank has a deformable and frangible collar portion axially extending upwardly to the top distal end of the fastener. The collar has a reduced wall thickness relative to the remainder of the shank. A flange around the top of the base is located at the junction between the shank and the base. The fastener is attached to a panel through a non-circular receiving hole. The collar is broken at radial break points aligned radially 90 degrees apart forming four outwardly extending segments. The segments are deformed toward the top side of the panel such that the panel is loosely captivated between the collar and the flange. Within a defined tolerance, the fastener is moveable laterally in all directions but cannot be fully rotated. In one embodiment, the fastener is an internally threaded nut.

In yet another embodiment, the invention provides a method of making an assembly by affixing the novel captive floating flare described above to a panel. The method comprises the initial step of providing a blank having a central axial bore and a shank with a deformable and frangible collar axially extending upwardly to a distal top end of the blank. Next, the blank is inserted into a panel with a non-circular receiving hole having a length and a width. The blank and the panel are then placed onto an anvil with the shank extending upwardly through the panel hole and the base of the fastener resting against the anvil. A punch tool is pressed on the top end of the collar such that the collar is broken and deformed toward the top side of the panel to loosely captivate the panel between the collar and the flange. The fastener is thereby laterally moveable in all directions while full rotation with respect to the panel is prevented. Preferably, the punch tool has a pyramidal work end that engages and breaks the fastener collar into four outwardly extending segments.

The invention provides the advantages of simplicity since the flare nut is formed from a single, stock component. Furthermore, the square design features of the shank do not have to be pre-formed. The flare nut has improved flare overlap for greater retention and float, which also avoids the problem of push-out as explained above.

These and other advantages will be apparent from the following drawings and description of the preferred embodiment. In this respect, before explaining at least one embodiment of the invention in detail, it is to be understood that the invention is not limited in its application or to the details of construction in the following description or illustrated in the drawings. The invention is capable of other embodiments and of being carried out in various ways.

BRIEF DESCRIPTION OF THE DRAWINGS

FIG. 1 is a perspective view of a prior art cage nut assembly;

FIG. 2 is a perspective view of a flare nut in accordance with a preferred embodiment of the invention;

FIG. 3 is a cross-sectional view taken along lines 3-3 of FIG. 2;

FIGS. 7*a* and 7*b* are a series of perspectives of the flare nut of FIG. 2 during formation in accordance with a preferred embodiment of the invention; and, FIG. 8 is a perspective view of the flare nut of FIG. 2 after the nut has been formed and installed on a panel.

DESCRIPTION OF PREFERRED EMBODIMENTS

Figure 4:
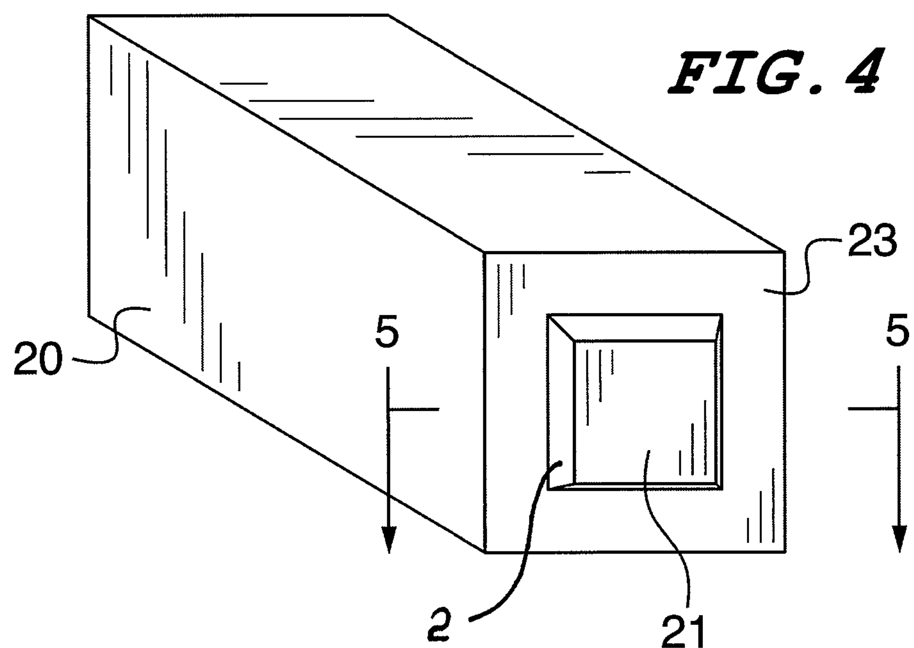
FIG. 4 is a perspective view of the punch tool in accordance with a preferred embodiment of the invention.

In accordance with one preferred embodiment, a nut blank 11 from which the flare nut is formed is shown in FIG. 2. The blank 11 generally comprises a cylindrical base 15 and a cylindrical shank 13 extending axially from one axial end of the base. The base 15 and shank 13 are co-axially aligned and have an axial bore 14 extending through the entire blank 11. In a preferred embodiment, the bore 14 is threaded to receive and engage a second fastener such as a bolt. The base 15 has a greater outer diameter than the shank 13, which forms a radially-extending flange 16 at the junction between the shank 13 and the base 15.

In the preferred embodiment shown in FIG. 2, the side wall of the shank does not have a uniform thickness. In this embodiment, the side wall of the shank has the irregular profile best seen in FIG. 3, which includes a tapered step 18 and an annular, frangible collar 17. The interior surface of the step extends radially outwardly towards the top of the blank 11 with reference to the orientation shown in FIG. 3. During formation of the flare nut 11, the collar 17, which is thinner than the step 18, enables outward flaring. The step 18 controls the flare depth and also provides a flatter flare to reduce protrusion from the backside of the panel. The step 18 has a thicker portion that prevents over-flaring and binding on the nut against the backside of the panel. Alternatively, the shank 13 may have a simple, cylindrical shape.

Figure 5:
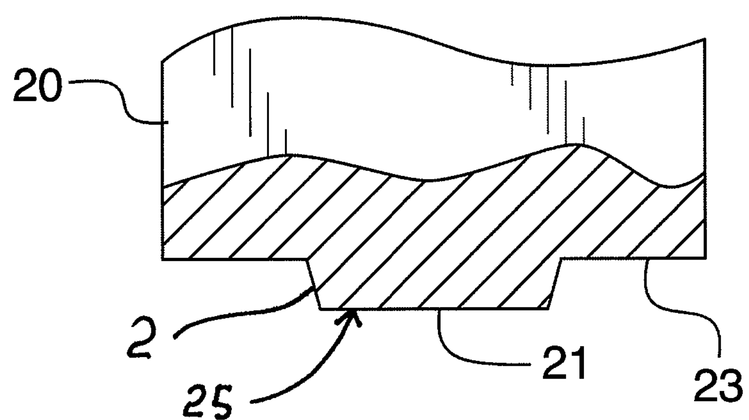
FIG. 5 is a partially-sectioned side elevation of the punch tool of FIG. 4.

A punch tool 20 in accordance with a preferred embodiment of the invention is shown in FIGS. 4 and 5. The tool 20 simultaneously flares the nut and creates an approximation of a square shank profile required to resist rotation. Referring to FIG. 4, the punch tool 20 has an overall square cross-section. However, the work end 25 of the punch tool 20 has a pyramidal shape that is tapered to facilitate lead-in alignment of the tool 20 into the bore 14 of the shank 13. In this embodiment, the work end 21 has a planar, square tip face 21, pyramidal punch faces 2, and a planar, square shoulder 23. The punch tool 20 both flares the nut and simultaneously creates an approximation of a square shank profile required to resist rotation. The depth of the flare and the flare profile on the nut are determined by the dimensions and profile of the work end 25 of the tool 20. For example, the punch tool 2 may be constructed to have a limited flaring depth at the transition point between the shoulder 23 and the tip 21 to reduce the degree of protrusion from the back side of the panel by making the flare flatter.

Figures 6A, 6B:
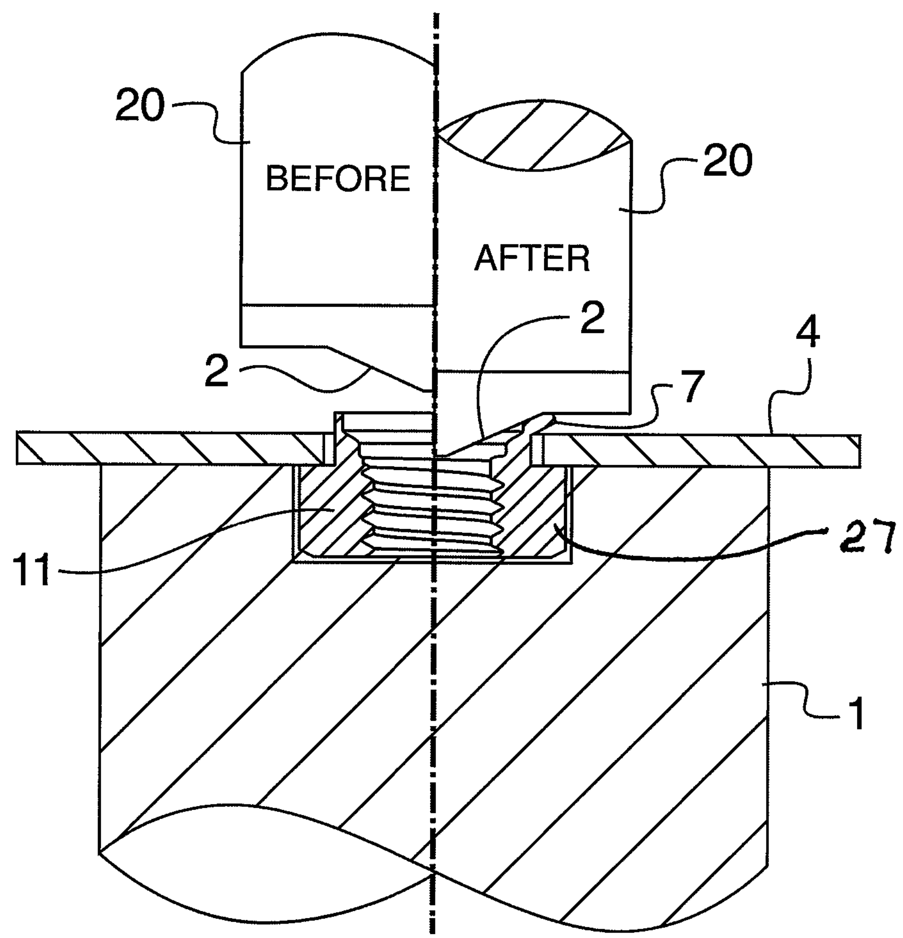
FIGS. 6*a* and 6*b* are sectional elevations of the flare nut of FIG. 2 during two formation and installation steps in accordance with a preferred embodiment of the invention.

FIGS. 6*a,b* and 7*a,b* illustrate a process for forming and installing the flare nut on a receiving panel 4 in accordance with a preferred embodiment. FIGS. 6*a* and 6*b* show a blank 11 on an anvil 1, on which a receiving panel is overlaid. In this illustration, the anvil 1 is a standard circular nested anvil.

Referring to FIG. 6*a*, the punch faces 2 on the punch tool 20 are initially oriented to match, i.e., align with, the flat faces (straight edges) of the rectangular hole in the receiving panel 4. The nut blank 11 is then inserted and aligned in the anvil. The panel 4 is then placed on the anvil 1 with the panel hole aligned with the punch tool 20. Preferably, the straight edges of the panel hole should be aligned with the punch faces 2. Proper alignment may be achieved using a jig, fixture or locating pins.

Referring to FIG. 6*b*, the punch 2 is then pressed into the shank 13 and splits the collar 17 into four equal segments 5 while simultaneously forming the shank 13 into a substantially square shape. In this intermediate formation condition shown in FIG. 7*a*, the fastener is designated generally by reference numeral 26. Finally, at the end of the pressing stroke, the punch 2 flares the segments 5 downwardly and outwardly to captivate the formed nut 27 to the panel 4. Splitting the shank 13 allows for greater flaring overlap, thereby increasing retention of the nut on the panel. The final formed nut is designated generally by reference numeral 27 in FIGS. 6*b*, 7*b* and 8.

FIGS. 7*a* and 7*b* more clearly illustrate the flare nut 27 at an intermediate stage 26 and final formation stage 27 in isolation without the attached panel. FIG. 7*a* shows the flare nut 26 in an intermediate stage of deformation wherein the punch is initially depressed into the bore 14 of the blank 11 and the side walls 5 of the blank become squared and slightly broken beginning the formation of segments 7. FIG. 7*b* shows the flared nut 27 in the final stage of deformation caused by further depression of the punch into the bore 14, which causes the side walls to split into segments 5 along the corner seams 6 with the ends of the segments 7 flared outwardly. FIG. 7*b* demonstrates that as the tool 20 is pressed into the shank 13, the collar 17 splits into four equal segments 7 while forcing the step portion 18 of the shank 13 into a substantially square shape.

FIG. 8 shows the flare nut 26 installed through a rectangular hole in a panel 8 with float adjustment provided in all four directions. The completed assembly shown in FIG. 8 was formed using the method described above. The segments 7 of the nut 26 are flared outwardly and toward the top side of the panel 4. The squared profile of the step portion 18 of the shank 13 prevents full rotation of the nut within the rectangular hole. The radially-extending segments 7 provide greater flare overlap, increased retention of the nut to the panel, and/or a greater degree of float compared with the prior art. Furthermore, because the blank 11 is circular, greater economies of manufacture can be achieved than if the blank were preformed into a different shape as disclosed in the prior art.

The invention claimed is:

1. The assembly of a fastener affixed to a panel, comprising:

a fastener with a central axial bore and a shank extending downward from a distal top end to a base of the fastener of greater diameter than the shank;

a deformable and frangible collar portion of the shank axially extending upwardly to the top distal end of the fastener, said collar having a reduced wall thickness relative to the remainder of the fastener;

a flange around the top of the base located at the junction between the shank and the base;

a panel having a non-circular receiving hole through which the fastener shank extends; and said collar being broken and deformed into radially extending segments adjacent a top side of the panel such that the panel is loosely captivated between the collar and the flange whereby the fastener is laterally moveable in all directions while being secured to the panel against full rotation.

2. The assembly of claim 1 wherein the fastener is a threaded nut.

3. The assembly of claim 1 wherein the segments are aligned radially 90 degrees apart.

4. The assembly of claim 1 wherein the shank is non-circular having a lateral width greater than the width of the receiving hole thus preventing full rotation of the fastener within the hole.

5. The assembly of claim 3 wherein the collar is broken into four outwardly extending segments.

6. The assembly of claim 1 wherein the fastener has an internal step located immediately below said collar.

7. The assembly of claim 5 wherein the receiving hole is a rectangular slot.

8. The method of affixing a fastener to a panel, comprising the steps of:

providing a fastener, comprising;

a central axial bore and a shank with a deformable and frangible collar axially extending upward to a distal top end of the fastener, said collar having a reduced wall thickness relative to the remainder of the fastener, said shank of the fastener extending downward to a base of the fastener of greater diameter than the shank; and a flange around the top of the base located at the junction of the shank and the base;

providing a panel with a receiving hole for accepting the fastener;

placing the fastener and the panel on an anvil with the shank extending upwardly through a non-circular panel receiving hole with the base of the fastener resting against the anvil; and applying a downward force to the top end of the collar with a tool such that the collar is broken and deformed into radially extending segments toward a top side of the panel whereby the panel is loosely captivated between the collar and the flange and the fastener is thereby laterally moveable in all directions while full rotation with respect to the panel is prevented.

9. The method of claim 8 wherein the fastener is a threaded nut.

10. The method of claim 8 wherein the collar is radially broken at radial break points aligned radially 90 degrees apart.

11. The method of claim 8 wherein the step of applying a downward force deforms the fastener shank from a circular to a non-circular lateral cross-section having a width greater than the width of the panel receiving hole.

12. The method of claim 8 wherein the downward force is applied by a tool having a pyramidal end which engages the fastener collar.

13. The method of claim 8 wherein the receiving hole is a slot.

14. The method of claim 12 wherein the tool has a lateral flat portion at a base of the pyramidal end to limit the depth of tool penetration into the fastener shank.

15. The assembly of claim 1 wherein the shank is cylindrical.

16. The method of claim 12 wherein the lateral cross-section of the pyramidal end of the tool is a square.

17. The method of claim 12 wherein the tool is moved by a punch of a press.

18. The method of claim 8 wherein the collar is broken into four outwardly extending segments.

19. The method of claim 18 wherein the fastener has an internal step located immediately below the collar to stop the downward advancement of the tool.

* * * * *